Dec. 24, 1929.  J. R. VALLÉ  1,740,526
SAFETY FENDER FOR MOTOR CARS
Filed June 22, 1929  5 Sheets-Sheet 1

INVENTOR
J. R. VALLÉ
BY
Mason, Fenwick + Lawrence
ATTORNEYS

Dec. 24, 1929.  J. R. VALLÉ  1,740,526

SAFETY FENDER FOR MOTOR CARS

Filed June 22, 1929   5 Sheets-Sheet 4

INVENTOR
J. R. VALLÉ
BY
Mason, Fenwick & Lawrence
ATTORNEYS

Dec. 24, 1929.   J. R. VALLÉ   1,740,526
SAFETY FENDER FOR MOTOR CARS
Filed June 22, 1929   5 Sheets-Sheet 5

INVENTOR
J. R. VALLÉ
BY
Mason, Fenwick & Lawrence
ATTORNEYS

Patented Dec. 24, 1929

1,740,526

UNITED STATES PATENT OFFICE

JOHN R. VALLÉ, OF NEW YORK, N. Y.

SAFETY FENDER FOR MOTOR CARS

Application filed June 22, 1929. Serial No. 373,003.

My invention relates to devices for preventing injury to pedestrians when struck by motor cars.

The prime object of the invention is to provide means whereby when the pedestrian is struck, the bumper will be retracted and will by its retraction automatically cause an apron or receptacle for the pedestrian to be projected instantly and positively so as to catch the pedestrian and prevent him from being run over by the car. Other objects of the invention will hereinafter appear.

To these ends, my invention, in its present embodiment, comprises a bumper projecting ahead of and entirely across the car in position to be struck by the pedestrian, and mounted movably so as to be retracted when so struck; and a frame carrying an apron or other receptacle to catch the pedestrian, normally held retracted against spring pressure by a locking device, which is released by the retraction of the bumper, so that the apron or receptacle will be instantly and positively projected by the spring pressure so as to catch the pedestrian and save him from injury.

In order that my invention may be fully understood, I shall first describe in detail the mode in which I at present prefer to carry this invention into practice.

Reference is to be had to the accompanying drawings forming part of this application for patent, in which like parts are designated by the same numbers in all the figures.

Figure 8:
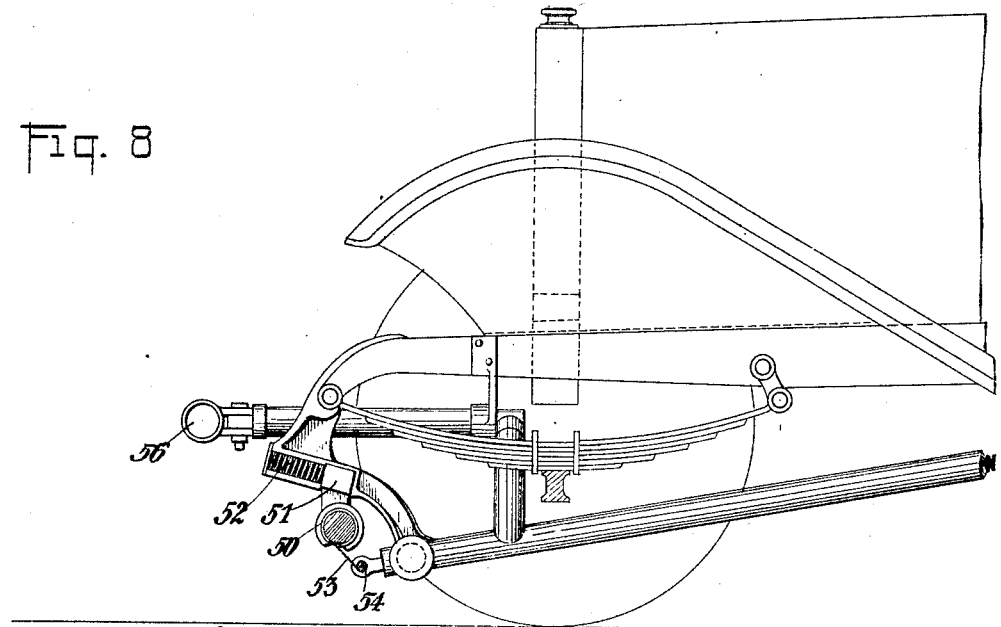
Figure 8 is a sectional side elevation, partly in section.
Figure 9:
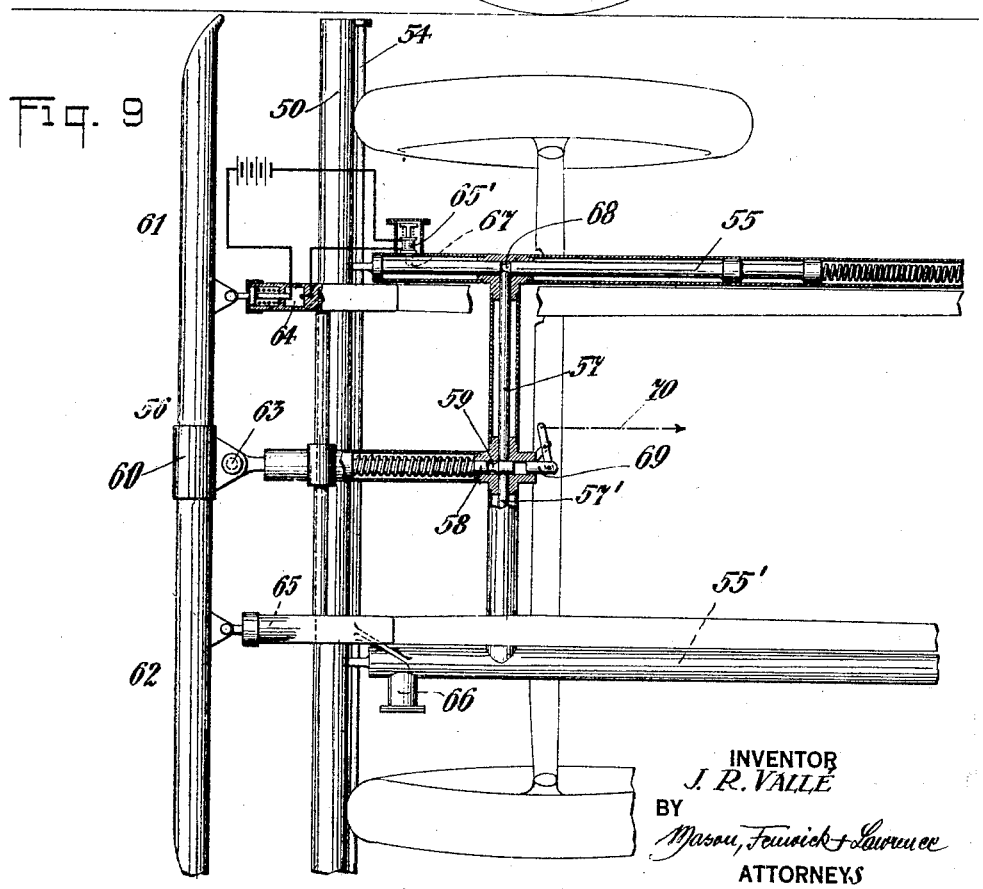

Figure 9 in plan view of Figure 8, partly in section.

Figure 1:
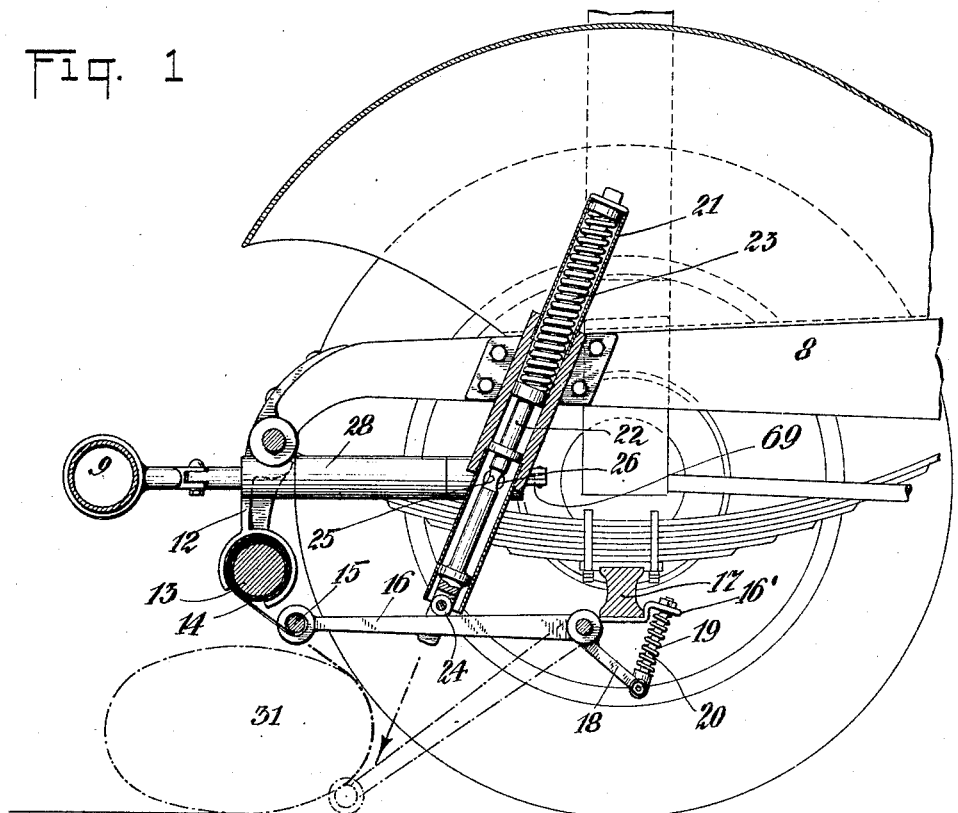
Figure 1 is a sectional side elevation of the forward part of a motor car provided with a safety fender embodying my invention.
Figure 2:
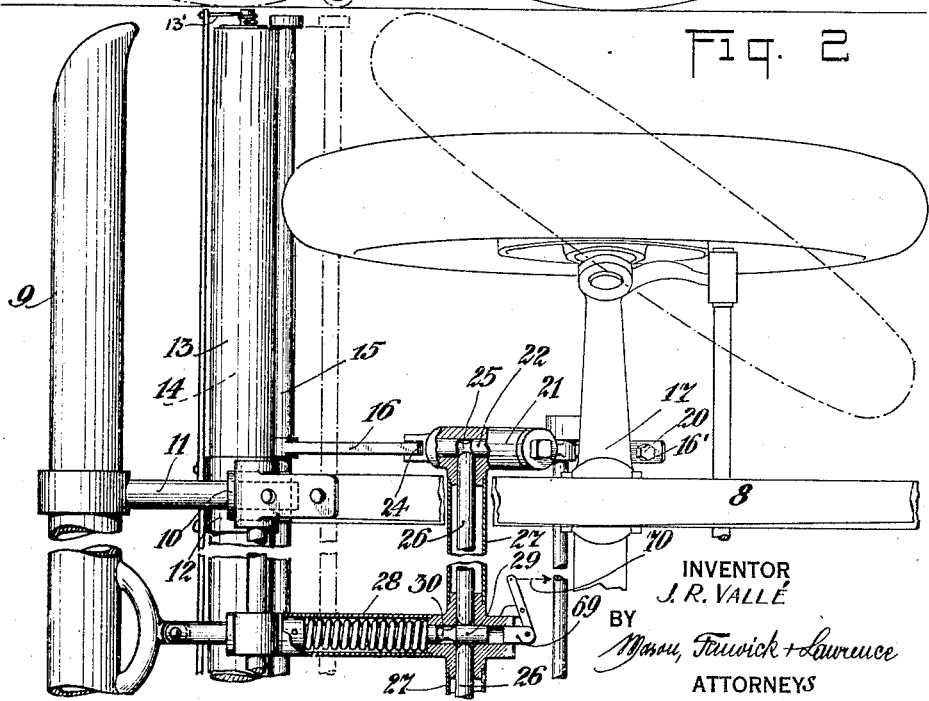
Figure 2 is a sectional plan view of a part of the same.

Referring to the specific embodiment of my invention shown in Figures 1 and 2, numeral 8, designates one of the two longitudinal side members of the frame of the motor car, on which I mount the bumper 9 extending across the front of the car in such a manner that it will be certainly struck by a pedestrian in any part of the path of the car and so that when struck it will be retracted.

I prefer to effect this, in this example of my invention, by attaching rigidly to the side members 8, longitudinal tubes or guides 10, in which are mounted to slide plungers 11 carrying the bumper 9.

On brackets 12 fixed to and depending from the frame of the car, I pivot, in this form of my invention, a transverse roller 13, on which is normally wound an apron or flexible receptacle 14, against the pressure of a coiled spring 13' adapted to rotate said roll 13.

The free end of this apron is preferably fastened to the forward cross bar 15 of an apron frame, the side arms 16 of which are pivoted, in this example, to brackets 16' fixed to the axle 17 of the car so that the apron frame when released can be swung downward to carry the free end of the apron to or close to the ground.

Arms 18 are fixed to the apron frame, and connected by springs 19, which hold side brackets 16 upward.

The apron frame is normally held retracted as indicated in full lines in Figure 1, by the springs 19, and the apron and spring 13' in the winding roller 13 (Fig. 2).

To project the apron frame instantly downward as described, when the bumper 9 strikes the pedestrian, I, in this example of my invention, prefer to employ the following means:

In inclined tubes or guides 21 fixed to the respective side members 8 of the motor car frame, are mounted to slide plungers 22, normally locked retracted against the pressure of compressed springs 23 in the guides 21, and the lower ends of said plungers are adapted to engage and force downwardly through preferably anti-friction rolls 24, the respective side members 16 of the apron frame.

To lock the apron projecting plungers 22 normally in their retracted position, shown in full lines in Figure 1, the plungers are formed with annular locking grooves 25, which are both simultaneously engaged by transverse locking bolts 26, sliding in transverse tubes or guides 27 fixed to a longitudinal tube or guide 28, which is in turn fixed to the frame of the motor car.

The locking bolts 26 are normally separated and held in engagement with the locking grooves 25, by a spring-pressed plunger 29, which slides in the longitudinal tube or guide 28, and is attached at its forward end to the movable bumper 9, so that when the bumper strikes the pedestrian, the plunger 29 will be retracted with it. The plunger 29 has a neck or constricted part 30 normally held forward of the locking bolts 26, which neck 30, when the bumper is retracted, comes between the bolts 26, and permits them to approach each other.

The spring-pressed apron projecting plungers 22 are thus automatically released by the retracted bumper, and instantly and positively force the free end of the apron to or close to the ground. The pedestrian or obstacle indicated by 31, in Figure 1, is thus picked up by and received in the positively projected apron and saved from serious injury.

Figure 3:
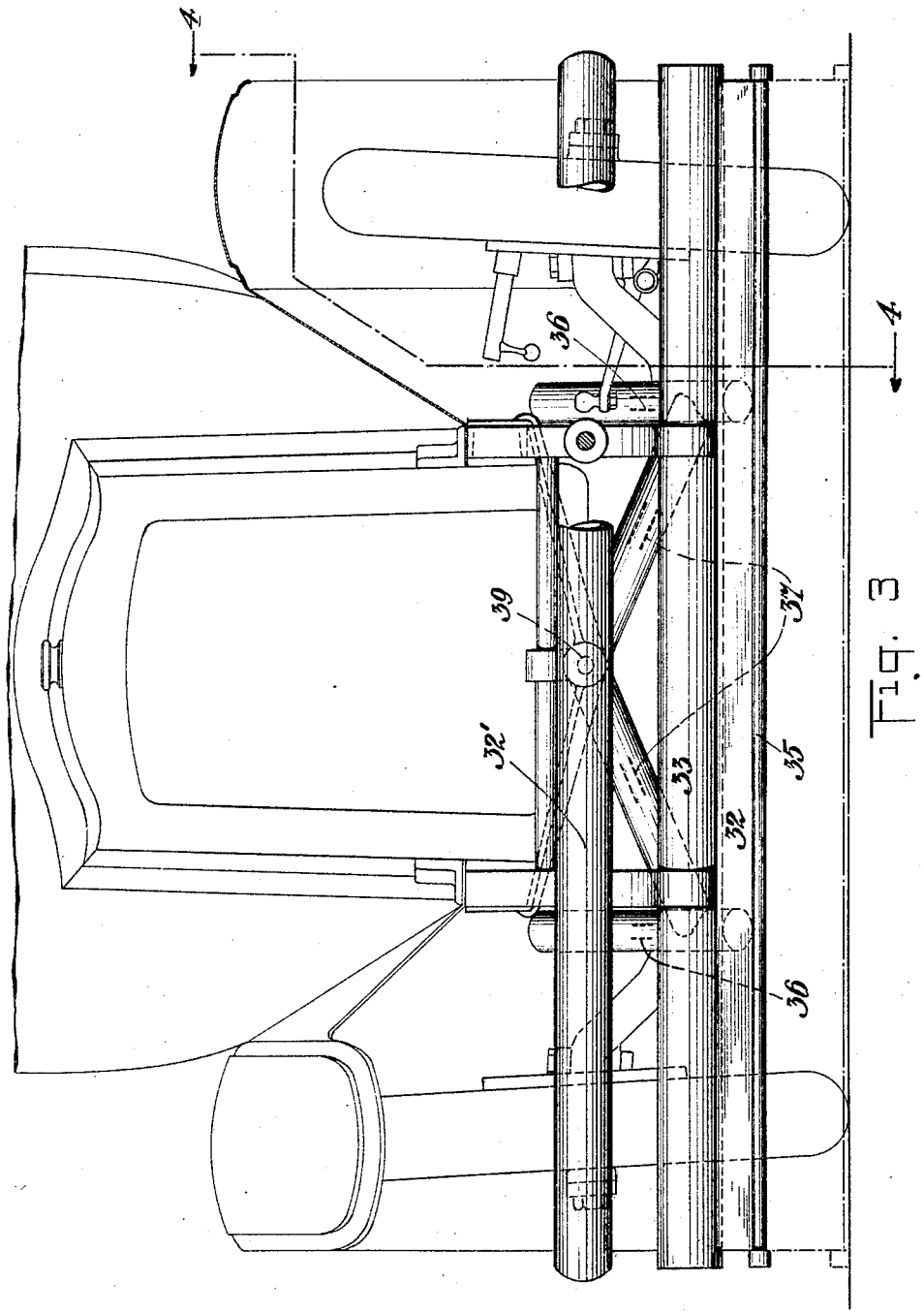
Figure 3 is a front elevation of a modification shown in Figure 4.
Figure 4:
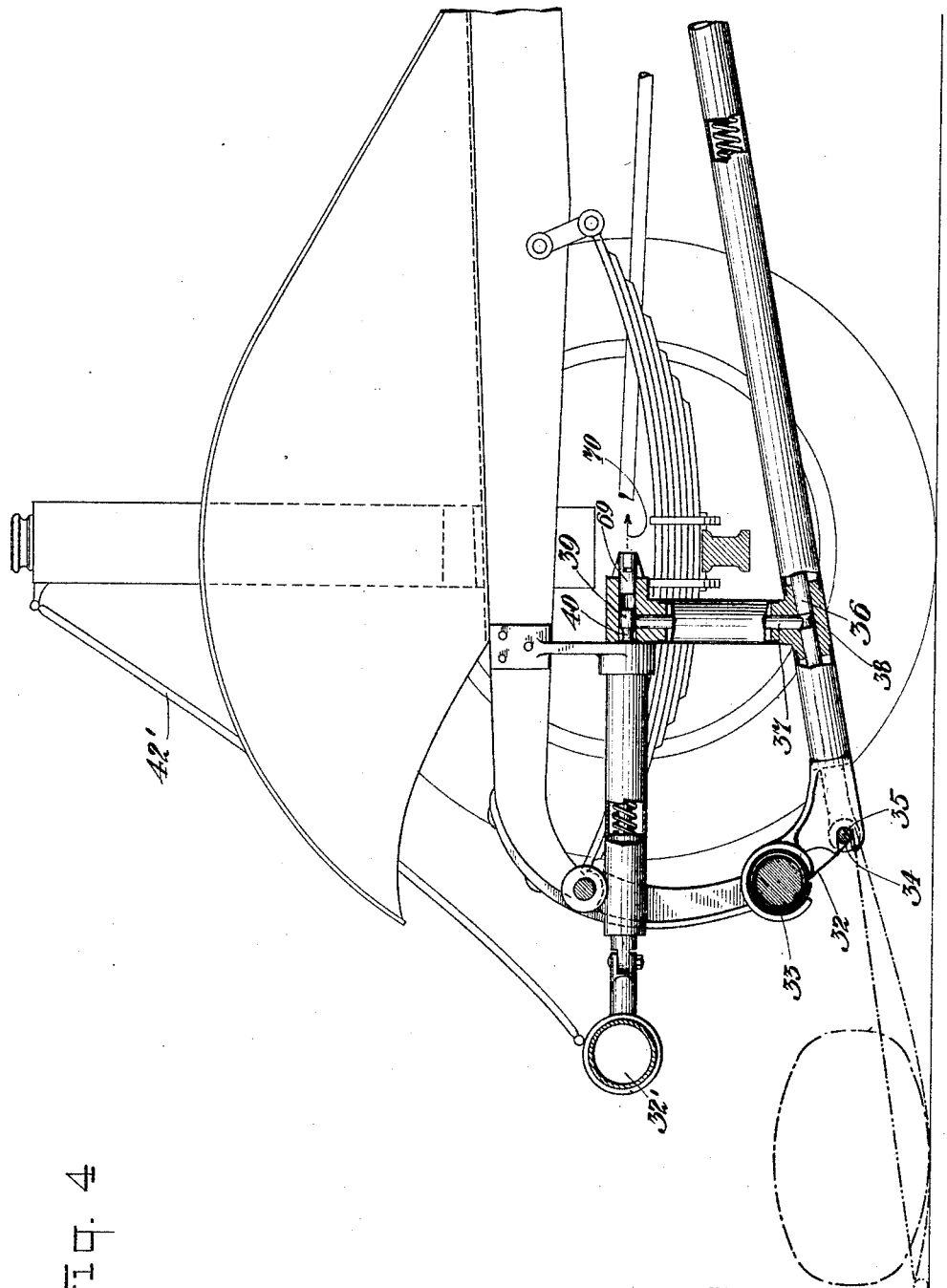
Figure 4 is a side elevation partly in section illustrating a modification.

In the modification of my invention illustrated in Figures 3 and 4, the apron 32, is wound on and unwound from a lower spring roller 33, and its free end 34 is fastened to an apron frame 35, which is projected at a very acute angle with respect to the ground. The spring pressed apron-projecting plungers 36 are normally held retracted by locking bolts 37 engaging, as previously described, locking grooves 38 in the plungers 36, and held in such locking engagement by a spring pressed plunger 39, having a neck 40 to release said locking bolts when the bumper 32' strikes the pedestrian and is retracted.

Figure 5:
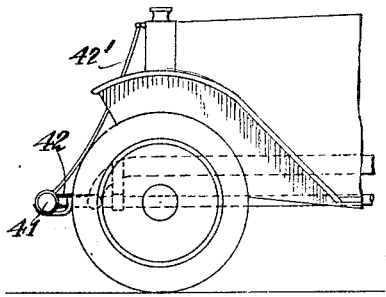
Figure 5 is a diagrammatic side elevation illustrating another modification with the bumper and apron retracted.
Figure 6:
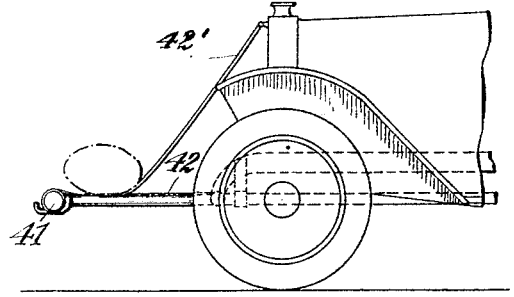
Figure 6 is a similar view showing the bumper and apron projected.
Figure 7:
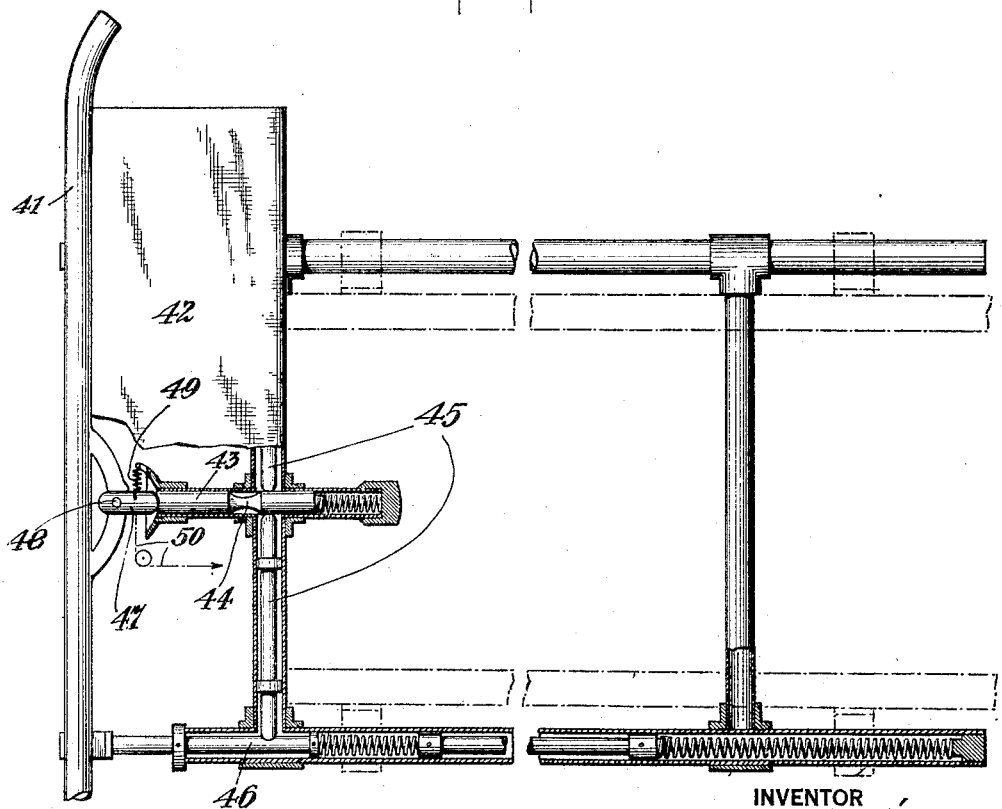
Figure 7 is a sectional plan view showing part of the modification shown in Figures 5 and 6.

In another embodiment of my invention shown in Figures 5, 6 and 7, the free end of the apron 42 is attached to the bumper 41 itself, and the bumper itself projected horizontally when struck by the pedestrian, so as to pick up the pedestrian in the apron, as indicated in Figures 6 and 7.

The bumper is fixed to a releasing plunger 43, with a neck 44, which, as before described in connection with Figures 1, 2, and 3, when the bumper is first retracted by striking the pedestrian, releases the transverse bolts 45, permitting the bumper 41 to be projected instantly and positively by the spring actuated side plungers 46.

In order to prevent the device being operated by slight collisions as in heavy traffic are inevitable, means for locking the device from the driver's seat, are provided. In connection with the modification, shown in Figs. 5, 6 and 7 a link 47 is connected by pivot 48 on bumper 41; the link 47, normally in line with releasing plunger 43, will transfer the movement from bumper 41 to plunger 43. By pulling rope 50, spring 49 will be overpowered and link 47 disengaged, thus locking the device.

Means for locking in connection with Figs. 1, 2, 4, 8 and 9 will be described with another modification shown in Figs. 8 and 9.

In this modification the lower spring roll 50 is mounted in sliding brackets 51. Springs 52 hold roll 50 close to crossbar 54, carrying the free end 53 of the apron. The spring pressed apron projecting plungers 55 and 55' project the apron forwardly and downwardly after bumper 56 releases locking bolts 57 and 57' by pushing plunger 58 in such position, that locking bolts 57 and 57' fall in groove 59. If the pedestrian is struck by the bumper on or around the center 60 the plungers will force the apron equally and straight forward. If the pedestrian is struck by the bumper on or around the ends 61 or 62, bumper 56 will turn around pivot 63 and close a circuit in contacts 64 or 65, energizing solenoids 65' or 66. The contact will be made on the side close to the pedestrian, thus shortening the movement of one of the plungers 55 or 55' by locking stud 67 in groove 68. Thus the plunger close to the pedestrian will move the distance from groove 68 to the stud 67 only. The unrestricted plunger 55 or 55' swings around the locked plunger. In order to stretch the canvas equally the spring 52 allows the spring roll 50 to follow the turn of crossbar 54. This modification is adapted to shift the apron angularly with respect to the car to get the pedestrian closer to the center of apron.

In order to lock the device in heavy traffic I use for modifications shown in Figs. 1, 2, 4, 8, and 9, a plunger 69, brought in locking position by pulling rope 70 from the driver's seat.

Referring to Figs. 4, 5 and 6, a network or single spring coils or single strips of any other elastic material are employed and indicated with 42 to protect the pedestrian from hurting himself on the radiator or the fenders of the car. This improvement can be used with any of the modifications.

It is evident that my invention may be carried out in many other specific embodiments without departing from its boundaries as defined by the following claims.

I claim as my invention:

1. A safety fender for motor cars comprising a rearwardly movable bumper projecting ahead of the car, a frame on the car frame carrying an apron adapted to be projected to pick up the obstacle, means to project the apron frame instantly and positively, a locking device to hold the apron frame retracted, and means whereby the retraction of the bumper on striking the obstacle releases the locking device and causes the apron frame to be projected by its motor to pick up the obstacle.

2. A safety fender for motor cars is accord with claim 1, in which the apron is wound on a spring roll pivoted on the frame of the car, and the free end of the apron is fastened to the apron frame.

3. A safety fender for motor cars in accord with claim 1, in which the apron frame is fixed on spring pressed plungers sliding on the car frame, and said plungers are retained by bolts engaging locking notches on the plungers, said bolts being held normally engaged by a plunger attached to the bumper, the bumper plunger having a neck to release the bolts and cause the apron frame to be instantly and positively projected to pick up the obstacle.

4. A safety fender for motor cars, comprising a rearwardly movable bumper projecting ahead of the car, a frame, an apron carried by the frame, means for projecting the frame forwardly, a locking device to hold the apron frame retracted, means whereby the retraction of the bumper releases the locking device and permits the apron frame to be projected forwardly, independent means controlling the distance the opposite sides of the apron frame can be projected forwardly and means operated by the bumper for operating said side control means.

5. A safety fender for motor cars comprising a rearwardly movable pivoted bumper, a frame having spring impelled side members adapted to project said frame forwardly, an apron carried by the frame, locking means for holding the spring impelled side members of the frame in retractive position, means operable by the bumper for releasing said locking means, independent means associated with each spring impelled side frame member adapted to restrict its stroke and independent means positioned on opposite sides of the bumper pivot for actuating said frame control means, whereby the rocking of the bumper on its pivot by an obstacle striking at either side thereof will operate to project the apron frame angularly forward toward the side of the object struck.

6. A safety fender for motor cars comprising a rearwardly movable pivoted bumper, a frame having spring impelled side members adapted to project said frame forwardly, an apron carried by the frame, locking means for holding the spring impelled side members of the frame in retracted position, means operable by the bumper for releasing said locking means, independent means associated with each spring impelled side frame member adapted to restrict its stroke and independent means positioned on opposite sides of the bumper pivot for actuating said frame control means, and means permitting angular adjustment of the apron frame with respect to the vehicle frame.

In testimony whereof I affix my signature.

JOHN R. VALLÉ.